United States Patent
Wataya et al.

(10) Patent No.: US 6,685,991 B2
(45) Date of Patent: Feb. 3, 2004

(54) METHOD FOR FORMATION OF THERMAL-SPRAY COATING LAYER OF RARE EARTH FLUORIDE

(75) Inventors: Kazuhiro Wataya, Fukui-ken (JP); Takao Maeda, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 196 days.

(21) Appl. No.: 09/917,631

(22) Filed: Jul. 31, 2001

(65) Prior Publication Data

US 2002/0015853 A1 Feb. 7, 2002

(30) Foreign Application Priority Data

Jul. 31, 2000 (JP) ........................................ 2000-230467

(51) Int. Cl.⁷ ............................ B05D 1/08; B32B 15/04; C23C 4/04
(52) U.S. Cl. ............... 427/446; 106/286.1; 106/287.18; 106/287.27; 427/447; 428/469; 428/696
(58) Field of Search ........................ 106/287.27, 286.1, 106/287.18; 427/446, 447; 428/696, 469

(56) References Cited

U.S. PATENT DOCUMENTS

| | | | | |
|---|---|---|---|---|
| 5,013,534 A | * | 5/1991 | Dissaux et al. | ............. 423/263 |
| 5,332,422 A | * | 7/1994 | Rao | ............................ 75/252 |
| 5,434,210 A | * | 7/1995 | Rangaswamy et al. | ...... 524/406 |

FOREIGN PATENT DOCUMENTS

| | | | | |
|---|---|---|---|---|
| FR | 2684684 A1 | * | 6/1993 | ........... C04B/35/50 |
| JP | 2-289422 | * | 11/1990 | ........... C01F/17/00 |
| JP | 5-305492 | * | 11/1990 | ........... B23K/35/40 |
| JP | 11-172233 | * | 6/1999 | ........... C09K/3/10 |

* cited by examiner

Primary Examiner—Anthony J. Green
(74) Attorney, Agent, or Firm—Wenderoth, Lind & Ponack, LLP

(57) ABSTRACT

The invention discloses a material and an efficient method for the formation of a thermal-spray coating layer of a rare earth fluoride by a process of thermal-spray coating by using a unique thermal spray powder consisting of granules of the rare earth fluoride having a specified average particle diameter. The thermal-spray granules are prepared by granulating primary particles of the rare earth fluoride having a specified average particle diameter from an aqueous slurry containing a binder resin and subjecting the granules to a calcination treatment at a temperature not higher than 600° C.

10 Claims, No Drawings

METHOD FOR FORMATION OF THERMAL-SPRAY COATING LAYER OF RARE EARTH FLUORIDE

BACKGROUND OF THE INVENTION

The present invention relates to a novel material and method for the formation of a thermal-spray coating layer of a rare earth fluoride or, more particularly, to an efficient method for the formation of a highly corrosion-resistant thermal-spray coating layer of a rare earth fluoride on the surface of a substrate.

The method of so-called thermal spray coating utilizing a gas flame or plasma flame is a well established technology for the formation of a coating layer having high heat resistance, abrasion resistance and corrosion resistance on the surface of a variety of substrates such as articles made from metals, concrete, ceramics and the like, in which a powder to form the coating layer is ejected or sprayed as being carried by a flame at the substrate surface so that the particles are melted in the flame and deposited on the substrate surface where the melt is solidified to form a coating layer solidified by subsequent cooling.

While oxide powders of aluminum, chromium and the like are employed as the conventional material of the thermal-spray coating layers, these oxide materials are not always quite satisfactory to withstand the plasma atmosphere of a halogen-containing etching gas at an elevated temperature frequently encountered in the manufacturing process of semiconductor devices in respect of the corrosion resistance.

Namely, it is very conventional that the manufacturing process of semiconductor devices involves a step of plasma etching using a halogen-containing gas. Examples of the halogen-containing or fluorine- and/or chlorine-containing gases used for plasma etching include $SF_6$, $CF_4$, $CHF_3$, $ClF_3$, $HF$, $Cl_2$, $BCl_3$ and $HCl$ either singly or as a mixture of two kinds or more.

It is known that a thermal-spray coating layer having particularly high resistance against corrosion in a plasma atmosphere of these halogen-containing gases can be obtained by using particles of aluminum fluoride as the material of coating among the above mentioned metal oxide powders. While the aluminum fluoride powder used in the prior art for the thermal-spray coating is prepared by pulverizing or grinding coarse particles of aluminum fluoride and used as such, such a powder is generally not satisfactory for the purpose due to the poor flowability sometimes to cause clogging of the feed tubes of the powder and the spray nozzles greatly decreasing the smoothness of the thermal-spray coating procedure or greatly decreasing the quality of the thermal-spray coating layer.

SUMMARY OF THE INVENTION

In view of the above described problems and disadvantages in the material and method of thermal-spray coating using particles of aluminum fluoride as the thermal spray powder, the present invention has an object to provide an improvement in the thermal-spray coating method with particles of a rare earth fluoride as the thermal spray powder by which the thermal-spray coating works can be conducted very smoothly and efficiently with high stability to give high productivity of the process and high quality of the thermal-spray coating layer.

Thus, the present invention provides a material and method for the formation of a highly corrosion-resistant coating layer of a rare earth fluoride on the surface of a substrate by thermal-spray coating, the method comprising the step of:

spraying particles of a rare earth fluoride at the substrate surface as being carried by a flame or, in particular, plasma flame to deposit a melt of the particles on the substrate surface forming a layer, in which the rare earth fluoride particles have a globular particle configuration having an average diameter in the range from 20 to 200 μm and are prepared by granulation of primary particles of the rare earth fluoride having an average particle diameter not exceeding 10 μm.

DETAILED DESCRIPTION OF THE PREFERRED EMBODIMENTS

As is described above, the most characteristic feature of the inventive method consists in the use of granules of a rare earth fluoride, as a novel material for thermal spray coating, having a specified average particle diameter as prepared by granulation of primary particles of the rare earth fluoride having a specified average particle diameter. The average particle diameter of the rare earth fluoride granules should be in the range from 20 to 200 μm. When the average particle diameter of the rare earth fluoride granules is too small, a substantial portion of the rare earth fluoride forming the granules may eventually be evaporated in the flame during the thermal-spray coating procedure resulting in a decrease in the utilizability of the thermal-spray powder while, when the average diameter of the granules is too large, large granules cannot be melted completely to the core in the flame resulting in a decrease in the quality of the thermal-spray coating layer of the rare earth fluoride.

The inventors have further continued investigation on the physical properties required for the rare earth fluoride granules and arrived at an unexpected discovery that the granules should have a powder compression factor S not exceeding 30%. The term of "powder compression factor" S here implied is defined by the equation $$\text{Powder compression factor } S(\%)=(\tau T-\tau A)/\tau T\times 100,$$

in which $\tau A$ is the bulk density of the granules and $\tau T$ is the tapped density of the granules.

Although the thermal-spray powder used according to the invention consists of granules obtained by granulation of primary particles of a rare earth fluoride, it is desirable that the granules have a relatively low porosity or small void spaces. This requirement is important to ensure good resistance of the granules against cracking in handling and to decrease emission of a gas occluded in the void spaces of the granules by the thermal spraying to cause melting of the granules.

In order to ensure little emission of gases from the granules melted in the flame, it is desirable that the content of water or hydroxyl groups in the rare earth fluoride particles should be as low as possible since water or hydroxyl groups may be an emission source of gases and may react with the rare earth fluoride to form corrosive hydrogen fluoride gas heavily affecting the quality of the thermal-spray coating layers of the rare earth fluoride. In this regard, the content of water and hydroxyl groups in the rare earth fluoride granules should not exceed 1% by weight.

The primary particles of a rare earth fluoride, from which the granules are prepared by using a suitable granulator machine such as a spray-drying granulator, can be prepared by mechanical grinding and particle size classification and should have an average particle diameter not exceeding 10

μm or, preferably, not exceeding 5 μm or, more preferably, not exceeding 3 μm. This requirement is important in order to obtain rare earth fluoride granules of a globular particle configuration having good flowability and suitable for the thermal-spray coating according to the present invention.

The rare earth elements forming the rare earth fluoride include yttrium and the elements having an atomic number in the range from 57 to 71, of which yttrium, cerium and ytterbium are preferable, though not particularly limitative thereto. These rare earth elements can be used either singly or as a combination of two kinds or more according to need. When two kinds or more of the rare earth elements are combined in the fluoride granules, it is optional that the granules are prepared by granulation of a blend of primary particles of the two kinds or more of different rare earth fluorides or the primary particles per se are prepared to include two kinds or more of the rare earth elements.

The procedure for the preparation of the rare earth fluoride granules from the primary particles is rather conventional. Namely, the primary particles of the rare earth fluoride are dispersed in water, an alcohol of 1 to 4 carbon atoms in a molecule, toluene, hexane and the like or a mixture thereof as a dispersion medium to give a slurry of 10 to 40% solid concentration which is subjected to spray-drying granulation to give granules of the rare earth fluoride. The granules are then subjected to a heat treatment at a temperature not higher than 500° C. or, preferably, in the range from 70 to 200° C. in vacuum or in an atmosphere of air or an inert gas such as argon, nitrogen and helium with an object to decrease the moisture content therein. The thus obtained granules are further subjected to a calcination treatment for 30 minutes to 5 hours in air at a temperature not exceeding 600° C. or, preferably, in the range from 300 to 500° C.

It is optional that the aqueous dispersion of the primary particles of a rare earth fluoride is prepared by using water containing a water-soluble organic resin such as carboxymethyl cellulose as a binder of the particles in order to facilitate granulation. The granules obtained in this way naturally contain the binder resin. It is optional that such binder resin-containing granules are subjected to a heat treatment in order to decrease the carbon content therein by burning-off of the binder resin.

Besides the above mentioned carboxymethyl cellulose as the binder resin, polyvinyl alcohol, polyvinyl pyrrolidone and the like can also be used as the binder resin. The amount of the binder resin, when used, is in the range from 0.05 to 10% by weight based on the amount of the primary particles of the rare earth fluoride.

The thermal-spray coating according to the present invention is performed preferably by the plasma thermal-spray coating or reduced-pressure plasma thermal-spray coating in which the plasma gas can be selected from argon and nitrogen as well as gaseous mixtures of nitrogen and hydrogen, argon and hydrogen, argon and helium, argon and nitrogen and the like, though not particularly limitative thereto.

The material forming the substrate, to which the method according to the present invention is applicable typically including members and parts of a semiconductor-processing instrument, is not particularly limitative and can be any of metallic materials such as aluminum, nickel, chromium and zinc as well as alloys of these metals and ceramic materials such as alumina, aluminum nitride, silicon nitride, silicon carbide and fused silica glass. The thermal-spray coating layer has a thickness usually in the range from 50 to 500 μm.

It is optional that the rare earth fluoride powder, with which the thermal-spray coating according to the present invention is undertaken, is admixed with a limited amount of a rare earth oxide powder which desirably has a particle size distribution close to that of the rare earth fluoride granules.

EXAMPLE 1

Primary particles of yttrium fluoride having an average particle diameter of 3 μm were prepared by grinding 5 kg of coarser particles of yttrium fluoride having an average particle diameter of 30 μm and containing 1000 ppm by weight of water and hydroxyl groups in a jet mill. The yttrium fluoride particles were dispersed in water under agitation to give an aqueous slurry of 30% by weight solid content. The aqueous slurry was subjected to granulation in a spray-drying granulator to give granules of globular particle configuration having an average particle diameter of about 50 μm which contained about 1% by weight of water. The content of water was determined by the Karl Fischer's method.

The globular granules of yttrium fluoride were subjected to a calcination treatment in vacuum at 400° C. for 2 hours. The moisture content of the thus calcined yttrium fluoride granules was less than 50 ppm by weight. The yttrium fluoride granules were found to have an aspect ratio of 1.03 and exhibit a powder compression factor S of 19% so as to be quite suitable as a thermal-spray powder for thermal-spray coating works. The above mentioned aspect ratio of the granules was an average value for 100 granules each of which was subjected to the measurement of the longest and shortest diameters of the granule contour on a scanning electron microscopic photograph. The powder compression factor was calculated from the bulk volumes of 30 g of the granules taken in a 100 ml measuring cylinder before and after 180 times tapping on a machine therefor (Stampfvolumeter Model STAV 2003, manufactured by J. Engelsmann Co.).

EXAMPLE 2

An aqueous slurry containing about 30% by weight of yttrium fluoride primary particles was prepared by dispersing 3 kg of the same yttrium fluoride primary particles as used in Example 1 in 6 liters of water with addition of 1 liter of a 1% by weight aqueous solution of carboxymethyl cellulose as a binder. The slurry was subjected to spray-drying granulation to give yttrium fluoride granules having an average particle diameter of about 45 μm, of which the content of carbon was about 0.3% by weight.

The thus obtained globular granules of yttrium fluoride were subjected to a calcination treatment in air at 500° C. for 1 hour to give calcined yttrium fluoride granules of which the content of carbon was less than 50 ppm by weight and content of oxygen was about 2000 ppm by weight each as determined by the infrared absorption spectrophotometric method. The thus calcined yttrium fluoride granules were found to have an aspect ratio of 1.04 and exhibit a powder compression factor S of 21% so as to be quite satisfactory as a thermal-spray powder in thermal-spray coating works.

Comparative Example

An aqueous slurry containing 30% by weight of yttrium fluoride particles was prepared by dispersing 5 kg of yttrium fluoride particles having an average particle diameter of 30 μm and containing 1000 ppm by weight of water and hydroxyl groups as a total. The slurry was subjected to spray-drying granulation but the particle configuration of the granules was not globular but irregular. The content of water in the granules was about 1% by weight.

The granules were subjected to a calcination treatment in vacuum at 400° C. for 2 hours to give calcined yttrium fluoride granules of which the moisture content was about 500 ppm by weight. The thus obtained yttrium fluoride granules were found to exhibit a powder compression factor of 35% so as not to be suitable as a thermal-spray powder for thermal-spray coating works due to their poor flowability.

What is claimed is:

1. A method for the formation of a thermal-spray coating layer of a rare earth fluoride on a substrate surface which comprises the steps of:

(a) granulating primary particles of a rare earth fluoride having an average particle diameter not exceeding 10 $\mu$m from an aqueous slurry thereof to give granules of the primary particles of a globular particle configuration having an average particle diameter in the range from 20 to 200 $\mu$m;

(b) subjecting the granules of the rare earth fluoride to a calcination treatment in air at a temperature not exceeding 600° C.; and (c) spraying the calcined granules of the rare earth fluoride at the surface of a substrate body as being carried by a flame so as to deposit a melt of the rare earth fluoride on the surface of the substrate.

2. The method for the formation of a thermal-spray coating layer of a rare earth fluoride on a substrate surface as claimed in claim 1 in which the temperature of the calcination treatment in step (b) is in the range from 300 to 500° C.

3. The method for the formation of a thermal-spray coating layer of a rare earth fluoride on a substrate surface as claimed in claim 1 in which the granules of the rare earth fluoride sprayed in step (c) has an aspect ratio of the granules not exceeding 2.

4. The method for the formation of a thermal-spray coating layer of a rare earth fluoride on a substrate surface as claimed in claim 1 in which the aqueous slurry of the primary particles of the rare earth fluoride contains a water-soluble polymeric resin in an amount in the range from 0.05 to 10% by weight based on the amount of the primary particles of the rare earth fluoride.

5. The method for the formation of a thermal-spray coating layer of a rare earth fluoride on a substrate surface as claimed in claim 4 in which the water-soluble polymeric resin is selected from the group consisting of carboxymethyl cellulose, polyvinyl alcohol and polyvinyl pyrrolidone.

6. A thermal-spray coating material which comprises granules of a rare earth fluoride having an average particle diameter in the range from 20 $\mu$m to 200 $\mu$m. the granules being formed from primary particles of the rare earth fluoride having have an average particle diameter not exceeding 10 $\mu$m.

7. The thermal-spray coating material as claimed in claim 6 in which the granules of the rare earth fluoride have an aspect ratio not exceeding 2.

8. The thermal-spray coating material as claimed in claim 6 in which the granules of the rare earth fluoride exhibit a powder compression factor not exceeding 30%.

9. A thermal spray-coated article which comprises (A) a substrate body of the article made from a metal and (B) a thermal-spray coating layer formed on the surface of the substrate body from the thermal-spray coating material as defined in claim 6.

10. The thermal spray-coated article as claimed in claim 9 in which the thermal-spray coating layer has a thickness in the range from 50 to 500 $\mu$m.

* * * * *